United States Patent [19]

Berrett

[11] Patent Number: 4,796,539
[45] Date of Patent: Jan. 10, 1989

[54] EXTENDERS FOR AIRCRAFT PALLETS

[75] Inventor: Thomas R. Berrett, Wallingford, United Kingdom

[73] Assignee: Brownline (U.K.) Limited, Hounslow, United Kingdom

[21] Appl. No.: 12,695

[22] Filed: Feb. 9, 1987

[30] Foreign Application Priority Data

Feb. 7, 1986 [GB] United Kingdom ................. 8603057
May 6, 1986 [GB] United Kingdom ................. 8610950

[51] Int. Cl.⁴ ............................................ B65D 19/44
[52] U.S. Cl. .................... 108/55.1; 108/54.1; 108/51.1; 108/90
[58] Field of Search ................. 108/55.1, 56.1, 56.3, 108/54.1, 51.1, 53.3, 53.5, 78, 80, 96, 99; 248/346

[56] References Cited

U.S. PATENT DOCUMENTS

| | | | |
|---|---|---|---|
| 2,701,080 | 2/1955 | Franklin | 108/55.1 X |
| 2,963,248 | 12/1960 | Anderson | 108/55.1 X |
| 3,620,388 | 11/1971 | Mansson | 108/55.1 X |
| 3,735,713 | 5/1973 | Glassmeyer | 108/55.1 X |
| 4,194,452 | 3/1980 | Crowther et al. | 108/99 X |
| 4,240,359 | 12/1980 | Howe | 108/56.1 X |
| 4,353,520 | 10/1982 | Jansson | 108/55.1 X |
| 4,445,616 | 5/1984 | Mancusi | 108/55.1 X |
| 4,475,704 | 10/1984 | Marom et al. | 108/55.1 X |

FOREIGN PATENT DOCUMENTS 2521257 8/1983 France ................. 206/600
2157647 10/1985 United Kingdom .

Primary Examiner—Peter A. Aschenbrenner
Assistant Examiner—JosACU /e/ V. Chen
Attorney, Agent, or Firm—Bernard R. Gans

[57] ABSTRACT

The disclosure relates to a pallet extender for mounting at an end of an aircraft cargo pallet comprising, a first elongate load support panel, hinges on one elongate edge of the panel to mount the panel along an end of a pallet to pivot about an axis extending along said edge of a panel. A second elongate panel, extends along the other elongate edge of the first panel and is connected thereto by a hinge to allow the second panel to pivot with respect to the first panel. Locking means act between the first and second panels to lock the second panel in any one of a plurality of different attitudes with respect to the first panel. Support structures are provided at both ends of said one panel extending to one side of the panel, and brace means connect the support structures to the pallet to support the panels at a required attitude with respect to the pallet. The support structures have mountings to support the second panel in a horizontal attitude when the first panel extends upwardly and outwardly of the end of the pallet supported by said brace means.

19 Claims, 12 Drawing Sheets

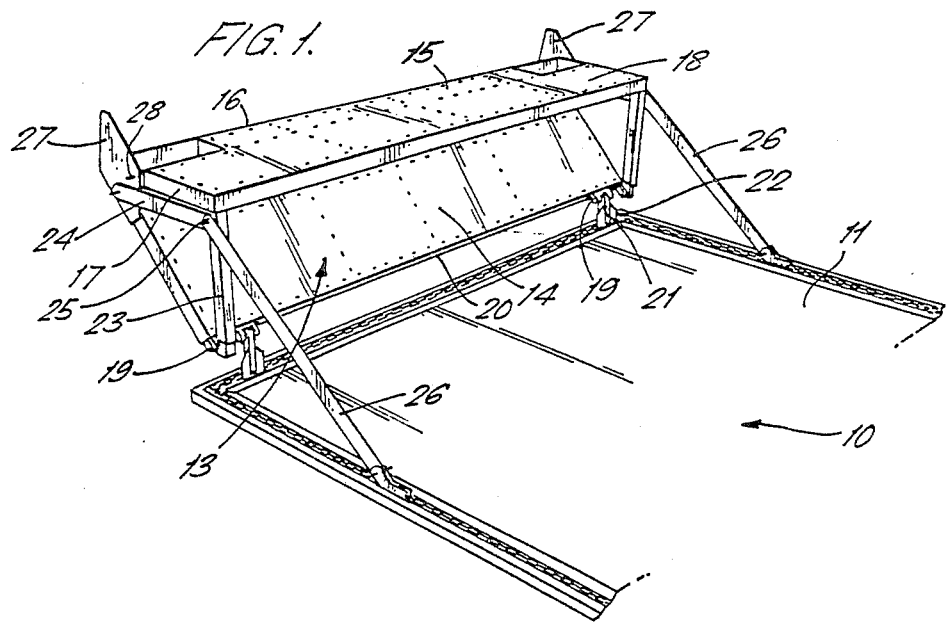
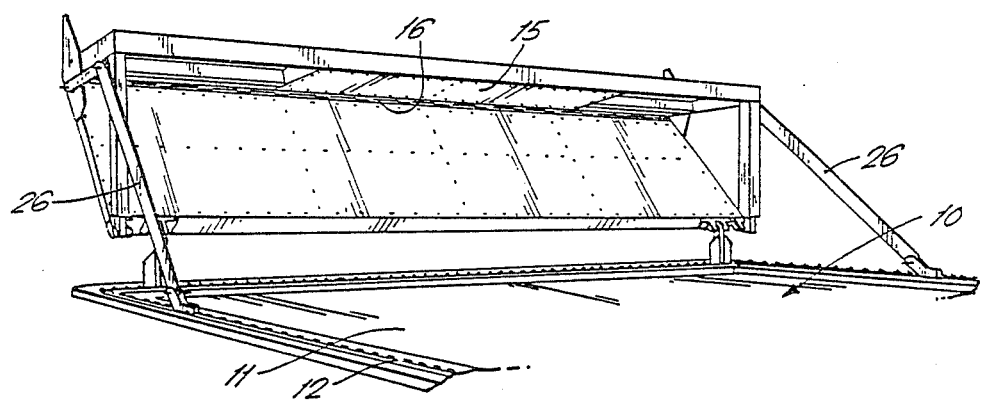

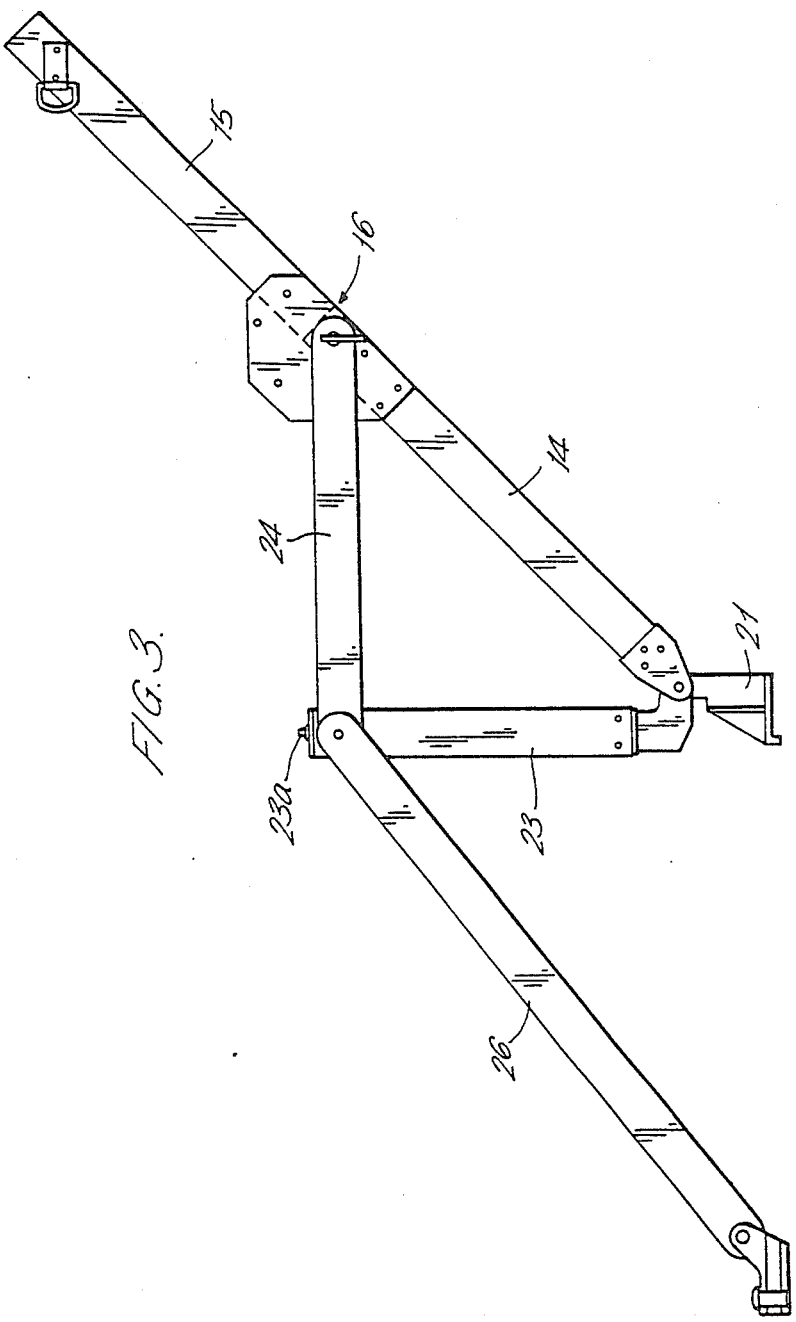

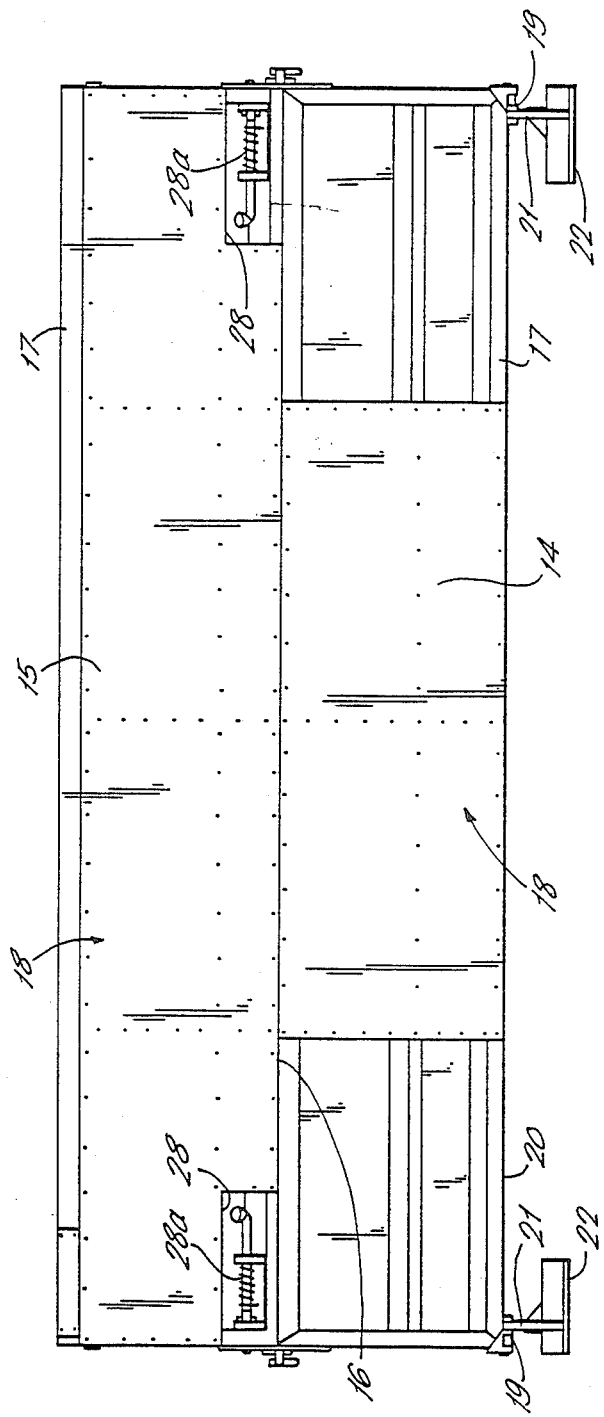

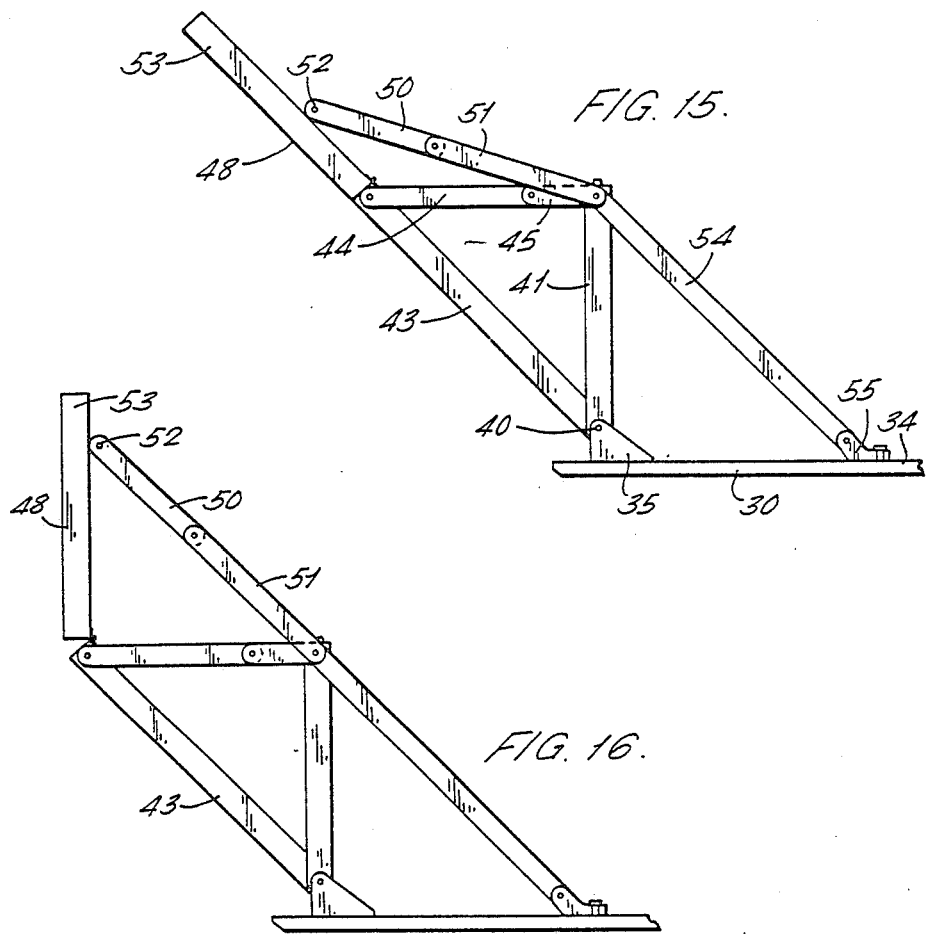
FIG. 15.
FIG. 16.
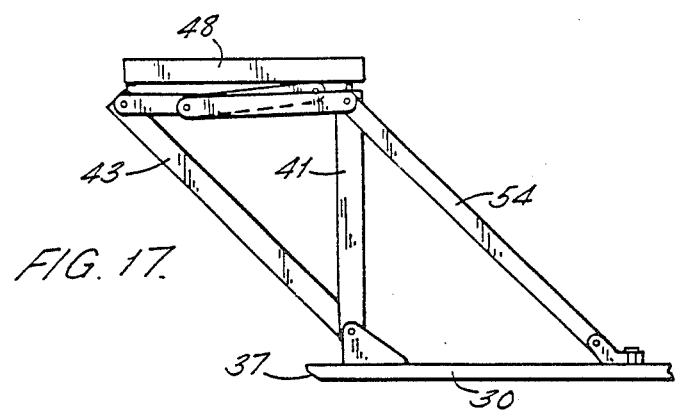
FIG. 17.

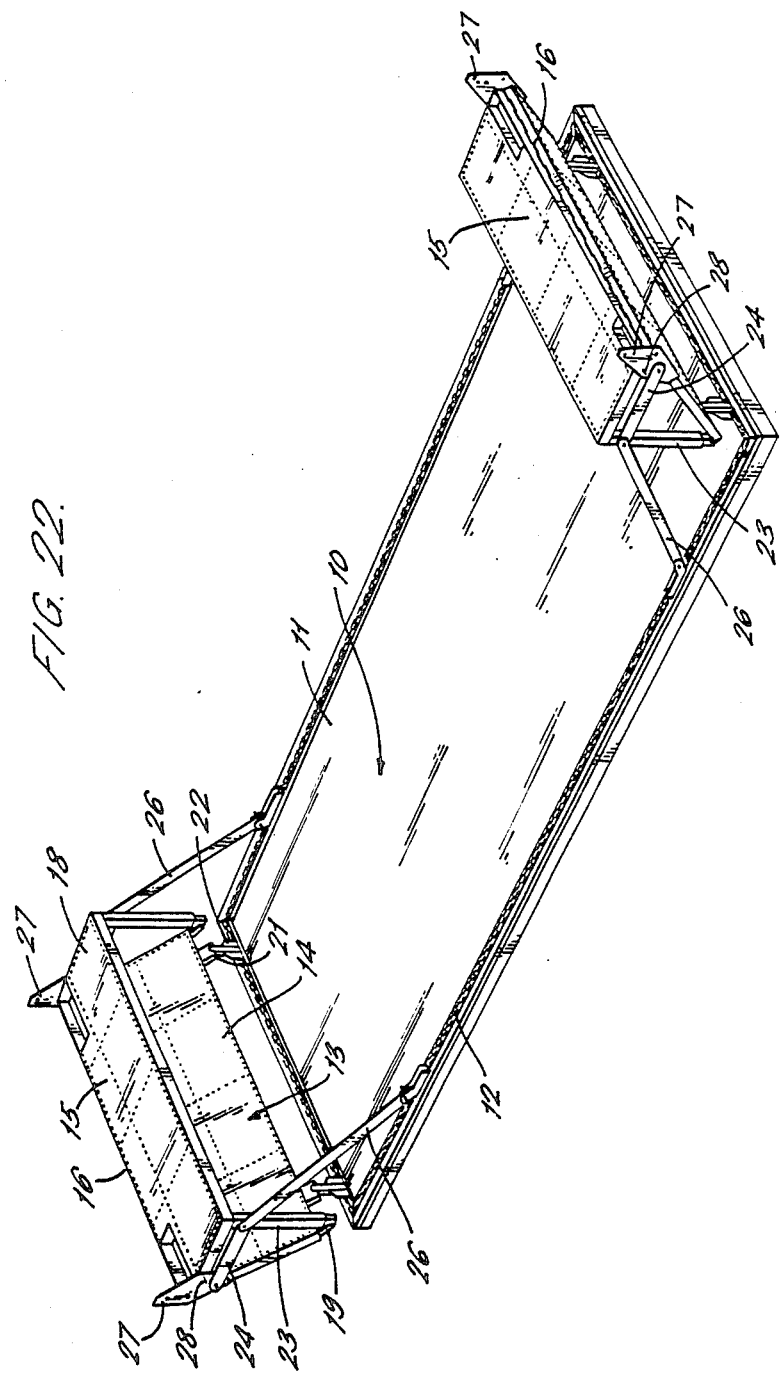

EXTENDERS FOR AIRCRAFT PALLETS

BACKGROUND OF THE INVENTION

1. Field of the Invention

This invention relates to extenders for aircraft pallets.

2. Background Prior Art

Cargo is commonly carried in aircraft holds which are situated in the lower part of the aircraft fuselage below the passenger compartment on flat light metal pallets supported on guide rails in the hold. Because of the outward curvature of the fuselage above the pallet the cargo stacked on the pallet cannot occupy fully the hold space. Pallet extenders have been developed to extend the cargo carrying area of the pallet into the curved sides of the hold. Difficulties arise with known forms of extender in that they tend to be suitable only for aircraft of similar diameter fuselages and are not readily adaptable to different aircraft. Moreover certain known extenders actually creat voids with the fuselage which cannot be used thus reducing the benefit which they seek to obtain. Examples of such extenders are disclosed in U.S. Pat. No. 4,475,704, issued to Marom, et al. on Oct. 9, 1984; British Patent Application No. GB 2,157,647A of Thorpe, published Oct. 30, 1985; and PCT Patent Application No. PCT/AU84/00187 of Jones, et al., published Mar. 28, 1985 under No. WO 85/01263.

SUMMARY OF THE INVENTION

The invention provides, a pallet extender for mounting at an end of an aircraft cargo pallet comprising, a first elongate load support panel, along one elongate edge of the panel to mount the panel along an end of a pallet to pivot about an axis extending along said edge of the panel, a second elongate panel extending along the other elongate edge of the first panel and connected thereto by hinge means to allow the second panel to pivot with respect to the first panel, locking means acting between the first and second panels to lock the second panel in any one of a plurality of different attitudes with respect to the first panel, support structures at both ends of said one panel extending to one side of the panel, and brace means connected to the support structures and adapted for connection to the pallet to support the panels with respect to the pallet, said support structures being adapted to support the second panel in a horizontal attitude when the first panel extends upwardly and outwardly of the end of the pallet supported by said brace means.

Each support structure may provide a support surface which faces upwardly and is spaced horizontally from the hinge between the first and second panels to receive and support the second panel the first panel at a required location spaced from the hinge to the first panel to support the second panel horizontally.

The support structure at each end of the first panel may comprise a leg connected at one end to said one edge of the panel to an arm connecting the other end of the leg to the other edge of the first panel to form a triangulated structure, the brace means being connected to the structure adjacent the other end of the leg which is also adapted to provide a support for the second panel with the letter in said acutely angled position with respect to the first panel.

The brace means may comprise a tie connected at one end to the support means and at the other end having means for attachment to the pallet at any required location along the edge of the pallet to hold the first panel in any required attitude with respect to the pallet.

In any of the above arrangements the means to respect to the first panel may comprise plates mounted on the ends of the first panel to encompass the arc of movement of the second panel with respect to the first panel and means to lock the second panel in any required position of adjustment with respect to the plates to lock the second panel with respect to the first panel.

Each plate may have a plurality of holes therein defining positions of adjustment to the second panel with respect to the first panel and locking members are provided to engage in the selected holes in the plates to lock the second panel to the plates.

In any of the above arrangements the means connecting the second panel to the first panel comprise an elongate hinge extending the length of the first and second panels.

The means to connect the first panel to a pallet may comprise two hinges spaced apart along said one elongate edge of the first panel, each hinge having one member attached to the first panel and a second member having means to attach to an edge part of the pallet.

The invention also provides a pallet extender for mounting adjacent an end of an aircraft cargo pallet comprising at least one load supporting panel to extend along an end of a pallet and adjustable support means for each end of the panel adapted to be mounted on opposed side edges of the panel to support the panel in a plurality of different positions/attitudes with respect to the panel including a position in which the panel lies upwardly and outwardly of the pallet in a plane parallel to the pallet to provide an extension of the load carrying area of the pallet in the position in which the panel is stowed on the surface of the pallet, the arrangement being such that in use, the full load of the pallet and cargo stowed on it is transmitted to the side edges of the pallet.

BRIEF DESCRIPTION OF DRAWINGS

FIG. 1 is a perspective view of a pallet extender installed on an aircraft cargo carrying pallet having a pair of hinged panels in which a first panel extends upwardly and outwardly of the end of the pallet and a second panel extends horizontally from the upper end of the first panel;

FIG. 2 is a further perspective view of the pallet extender as shown in FIG. 1 from a different aspect;

FIG. 3 is a side view of the pallet extender of FIGS. 1 and 2 with the second panel oriented in alignment with the first panel;

FIG. 4 is an end view of the pallet extender as shown in FIG. 3;

FIGS. 15 to 20 illustrate the extender of FIG. 14 in different positions of adjustment and FIG. 21 is a perspective view of a modification for the extender.

FIG. 22 is a perspective view of the pair of pallet extenders as installed on an aircraft cargo carrying pallet.

DESCRIPTION OF THE PREFERRED EMBODIMENTS

Figure 5:
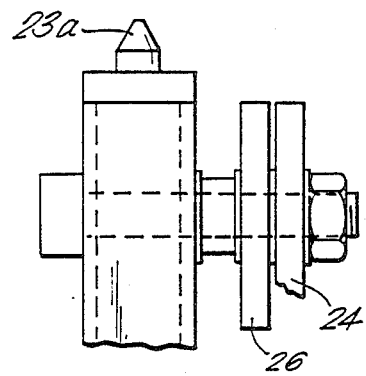
FIG. 5 is a further view on a part of the pallet in the direction of the arrow A on FIG. 3.
Figure 6:
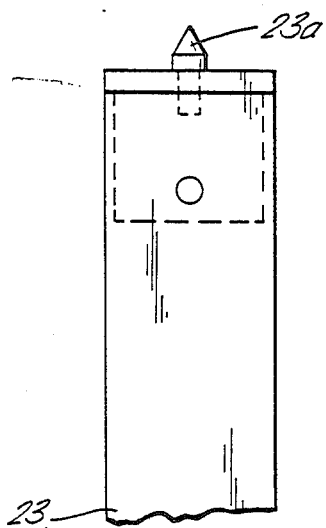
FIG. 6 is a detailed view of an upright support leg of the pallet extender.

Referring firstly to FIGS. 1 and 2 of the drawings, there is shown a standard aircraft cargo carrying pallet 10 comprising a panel 11 of aluminium having an extruded channel section 12 extending around the periphery thereof to stiffen the panel and to receive attachment devices. The track has an upwardly open slot and apertures are cut in the slot at spaced locations along the track to receive plungers/fixing bosses of standard attachment devices in known manner.

Cargo pallets of the type described above are installed on guide rails in the holds of aircraft below the floor of the passenger compartment and therefore lie in the lower part of the curved fuselage of the aircraft. Thus the aircraft hold widens above the location where the pallet is supported in the hold and it is desirable that that space is fully utilised for carrying cargo. However, the cargo cannot satisfactorily over hang the ends of the pallet without the provision of additional support and the pallet extender which will now be described with reference to the drawings is intended to provide that support.

A pallet extender indicated generally at 13 is mounted at each end of the pallet 10 to extend the load carrying area of the pallet. The construction of the pallet is shown in greater detail in FIGS. 3 to 7 to which reference is now made. The pallet extender comprises two elongate rectangular panels 14, 15 which are hinged together by an elongate hinge 16 extending along the length of the panels. Each panel comprises a metal framework indicated generally at 17 and is covered by a light sheet metal skin 18. The panels 14 has two spaced hinges 19 attached along an edge 20 thereof. Each hinge includes a leg 21 which terminates in an attachment device 22 for engaging in the track 12 extending along the end of the pallet. The panel 14 is thus supported on the end of the panel to hinge with respect to the end about an axis extending between the end of the pallet and the adjacent edge 20 of the panel.

Two legs 23 are also pivotally connected to the hinges 19 of the panel 14 at the ends thereof. The legs extending outwardly of the panel at 45 degrees thereto and are supported by struts 24 extending from the end of the panel adjacent the other edge and connected by elements 25 to the legs adjacent the free ends thereof. Tie members 26 are also connected at one end to the connection elements 25 and extends to the legs. The tie members extend downwardly along the pallet. The lower ends of the tie members have standard attachment devices to engage in the track 12 to lock the ends of the tie members in requires positons of adjustment along the track and therefore support the legs 23 in required attitudes with respect to the end of the pallet. As shown in FIG. 3, with the legs locked vertically with respect to the horizontal panel 14 extends upwardly and outwardly from the ends of the pallet at an angle of about 45 degrees.

In the arrangement of FIGS. 1 and 2 the second panel 15 of the extender as shown in FIG. 1 is folded back on the lower panel 14 to lie horizontally over the lower panel and is supported on the upper ends of the legs 23. The latter have upwardly projecting spigots 23a to engage in the underside of the frame of panel 14. In that position the pallet extender provides enclosed space under the panel 15 within panel 14 for further cargo to be carried and further cargo can be supported on the upper surface of the horizontal panel 15.

Figure 7:
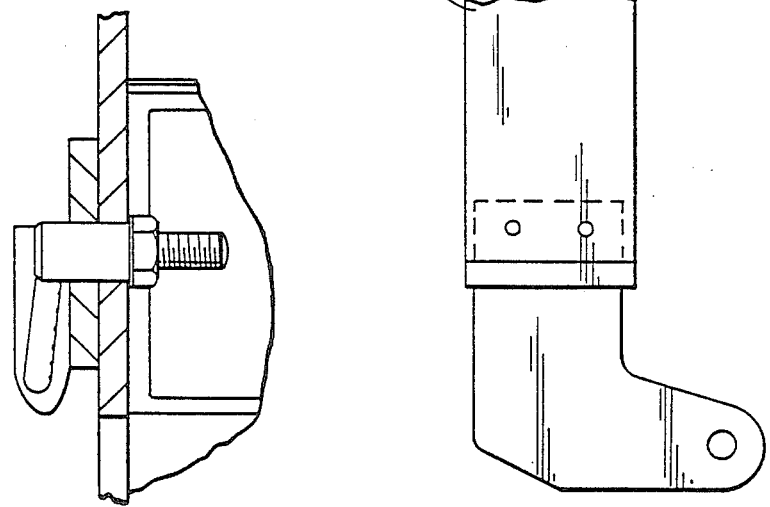
FIG. 7 is a section on the line F—F on FIG. 3.
Figure 8:
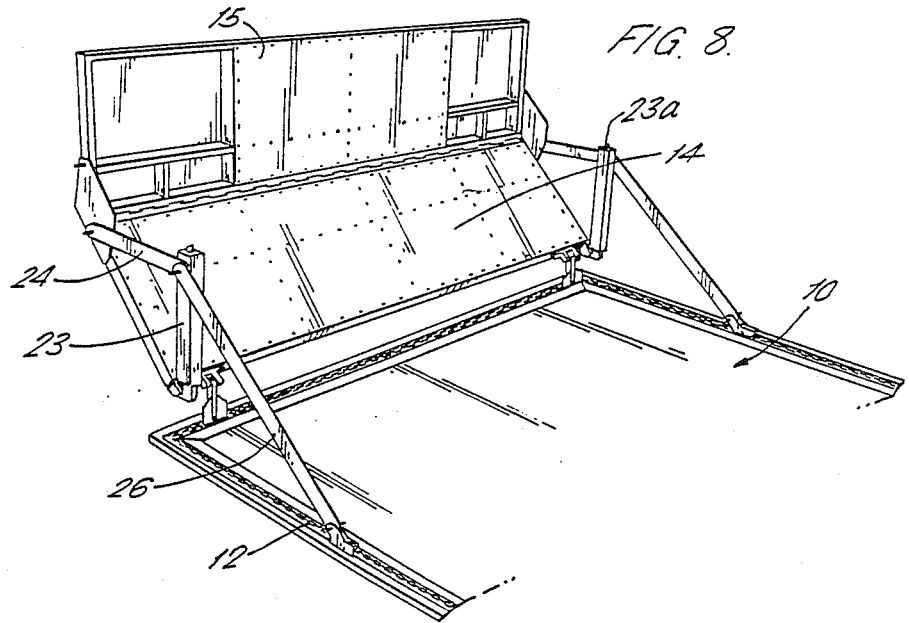
FIGS. 8 to 13 show the extender in different positions of adjustment.
Figure 9:
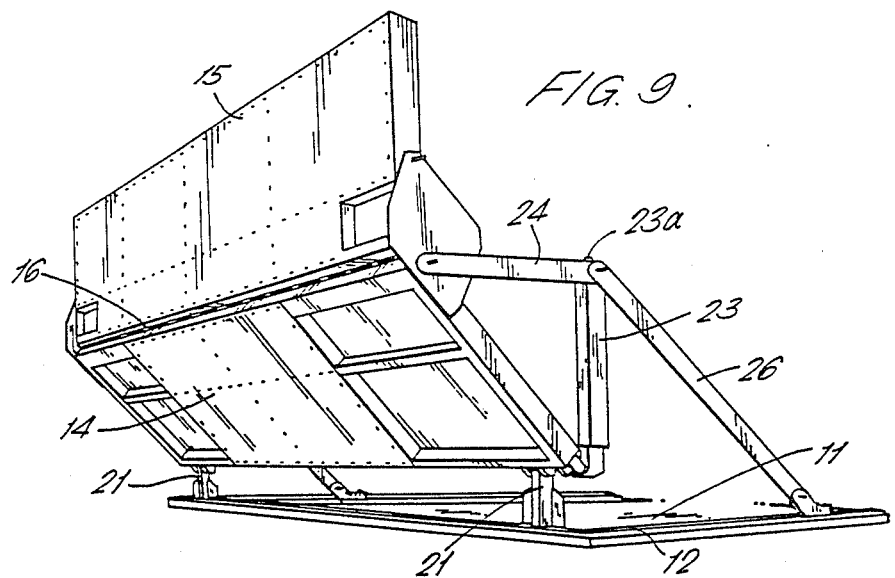
Figure 10:
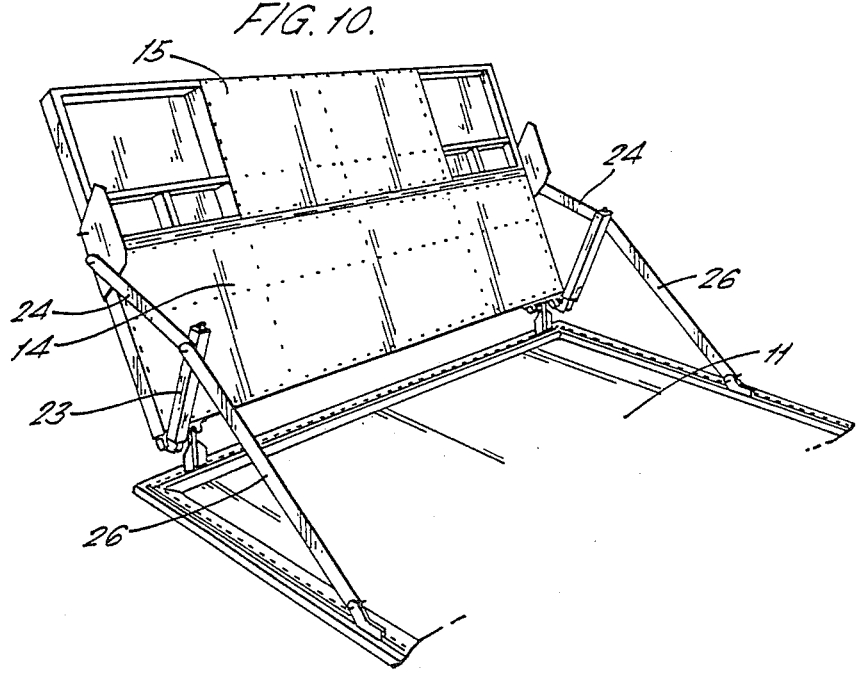
Figure 11:
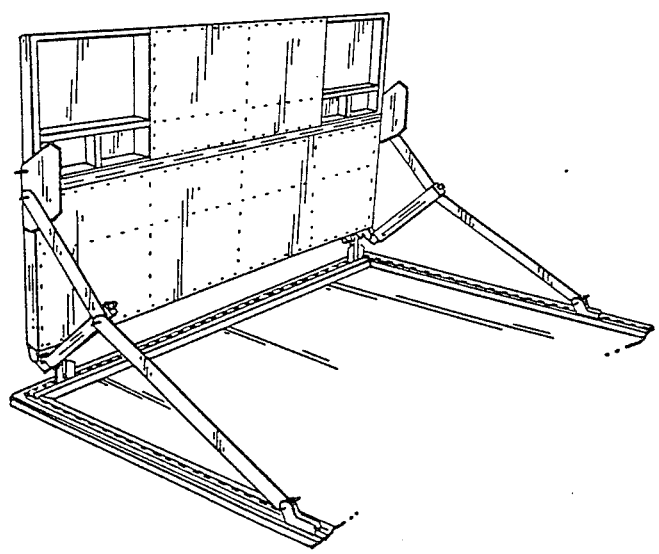
Figure 12:
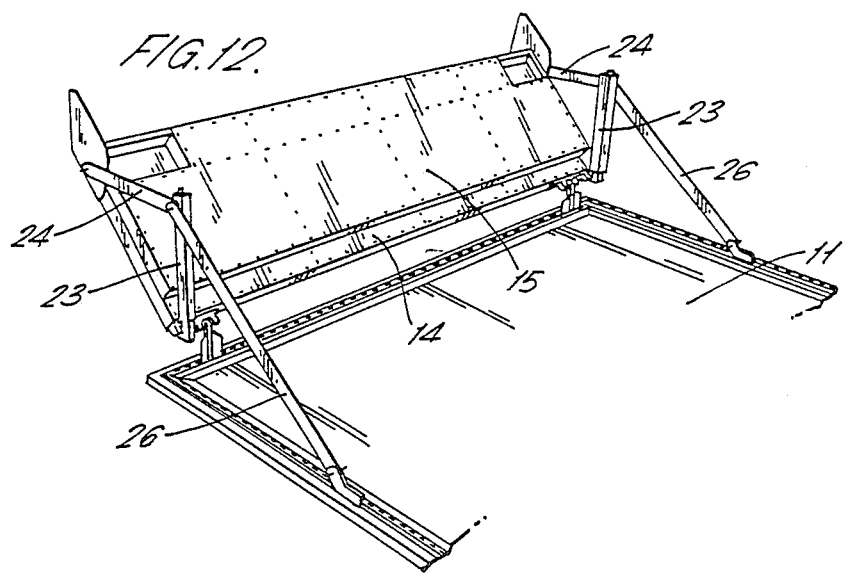
Figure 13:
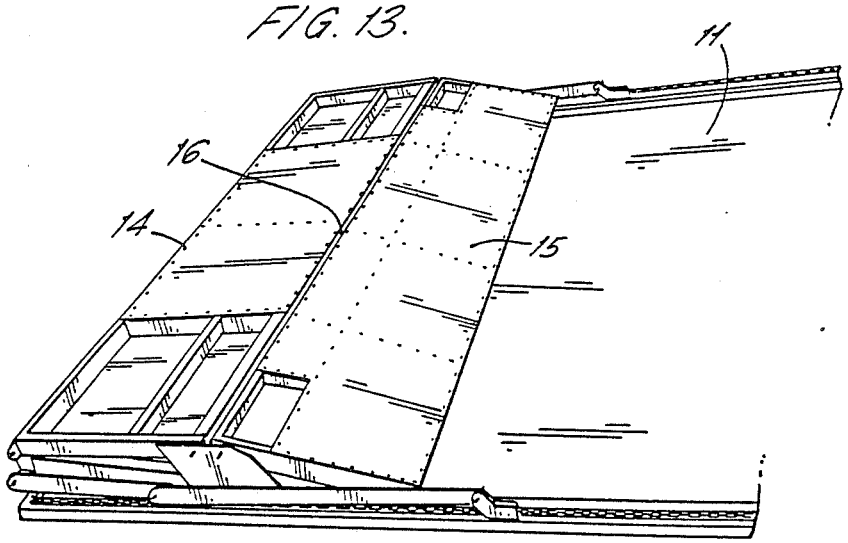

The panel 15 can itself be locked in a number of positions of relative rotation with respect to the panel 14. This is achieved by means of locking plates 27 which are mounted at the ends of panel 14 remote from the pallet and each having a plurality of spaced apertures 27a through which spring loaded locking devices 28 disposed in recesses 14a in the lower corners of panel 15 can project to engage in apertures provided in the ends of panel 15. The panel 15 can thus be locked in a horizontal attitude shown in FIG. 1, the vertical attitude shown in FIGS. 8 and 9, the in-line attitude with panel 14 as shown in FIG. 3 and FIG. 10 in which the pair of panels extends obliquely outwardly of the panel or in FIG. 11 in which the pair of panels extend vertically with respect to the pallet. FIGS. 12 shows panel 15 folded past the legs 23 downwardly on to panel 14 and FIG. 13 shown a complete extender structure collapsed on to the top of the panel. The arms 24 are connected by folding link connections 24a to the upper ends of panel 14 is shown in FIGS. 3 and 7 and these connections are released to allow the arms to be disconnected from panel 14 to allow the structure to fold flat. The panel 14 and the struts 26 are slid along the pallet.

The arrangement thus provides a highly versatile structure capable of taking up a number of different attitudes according to the load to be carried. When the pallet is being returned out of use. The extender can be collapsed down to permit a number of pallets to be stacked one on top of the other occupying the minimum space.

Figure 14:
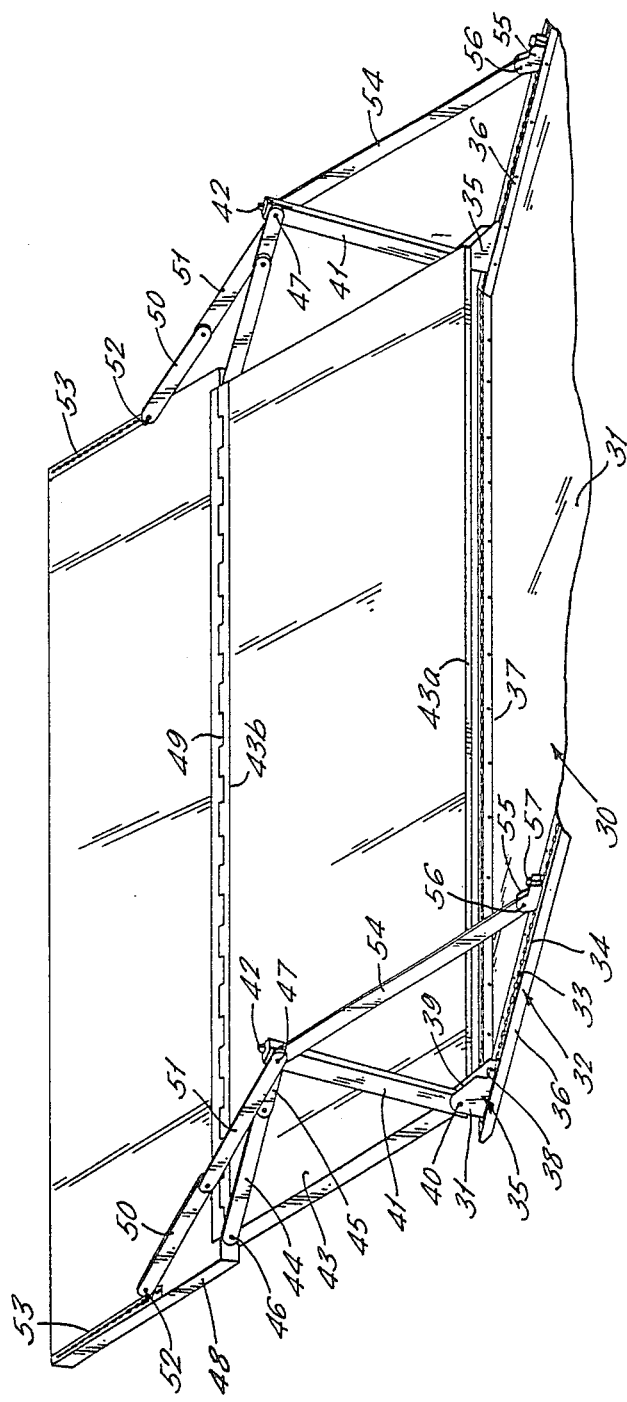
FIG. 14 is a perspective view of part of an aircraft cargo pallet with a further form of pallet extender mounted thereon.

Referring firstly to FIG. 14 of the drawings there is shown a standard aircraft cargo carrying pallet 30 comprising a aluminium panel sheet 31 having an extruded channel section 32 secured to the periphery thereof to stiffen the panel and to receive attachment devices for securing a load in place on the pallet. For that purpose the track has an upwardly open slot 33 in which spaced apertures 34 are cut to receive plungers/fixing bosses of standard attachment devices in known manner.

Cargo pallets of the above type are installed on guide rails in the holds of aircraft below the floor of the passenger compartment and therefore lie in the lower part of the curved fuselage of the aircraft. The aircraft fuselage widens above the levelat which the pallet is supported and whilst it is desirable to utilise that extra width for storage of cargo, it is not satisfactory to allow the cargo on the pallet to overhang the ends of the pallet even through it is constrained by netting strapped over the load on the pallet.

A pair of pivotal mountings 35 are secured to the track 34 along the sides 36 of the pallet adjacent one end 37 thereof. Each pivotal mounting has a locking device 38 for securing the mounting to the track and has a pair of upstanding side by side spaced apart cheek plates 39 through which a pivot pin 40 extends.

The mountings 35 are located in alignment across the pallet with the pivot pins 40 directly in alignment providing a common axis across the pallet adjacent the end thereof. Two king-posts 41 are pivotally mounted at their lower ends on the pivot pins 40 between the cheeks 39 of the two pivotal mountings respectively and each king-post 41 has an upstanding stud 42 at its upper end the purpose of which will be described later. A rectangular load supporting panel 43 extends between the pivotal mountings 35 and the pivot pins 40 of the mountings 35 extend into the ends of the panel adjacent one side edge 43a of the panel to support the panel for pivotal movement about said common axis extending along the end of the pallet.

The ends of the pallet adjacent the other side edge 43b of the panel, two part folding linkages 44,45 are pivotally connected to the ends of the panel and to the upper ends of the posts 41 at 46 and 47 respectively. The panel 43 is thus supported in an outwardly inclined position with respect to the posts 41 with the linkage 44, 45 extended and, by collapsing of the linkage can be folded into line with the posts 41.

A further load supporting panel 48 extends along and is hinged at 49 to the side edge 43b of the panel 43. The panel 48 is slightly longer than the panel 43 and projects beyond the panel at either end thereof. Further two part folding linkages 50, 51 connect the upper end of the post 41 by means of the pivotal connection 47 referred to above to the panel 48. The linkages are connected to slide members 52 which engage in slideways 53 extending along the ends of the panel. The sides may be fixed in any required position of adjustment along the slideway so that with the linkages 50, 51 fully extended from the posts 41 as shown in FIG. 1, the attitude of the panel 48 can be adjusted by movement of the slides along the slideways to adjust the angle of the panel 48 with respect to the panel 43.

In order to support the panel/linkage assembly in a required attitude with respect to the pallet tie members 54 are provided for each king post 41 connected to the pivots 47 at the upper ends of the king posts at one end and having anchor devices 55 pivotally connected to the other ends at 56 and engaged in the tracks 34 extending along the sides of the pallet. Each anchorage 35 has a spring loaded plunger 57 for locking the anchorage in a required position of adjustment along the track so that the attitude of the panel/linkage assembly can be adjusted simply by moving the anchorages 55 along the pallet edges.

The arrangement of the linkages and slides enables the panel assembly 43, 48 to be pivoted through a wide range of positions of adjustment which are illustrated in FIGS. 15 to 20. In FIG. 15 the posts 41 are held vertically with respect to the pallet 30 by the tie members 54 and the lower panel 43 is swung outwardly of the posts 41 and is supported at its upper ends by the folding links 44, 45 to extend upwardly and outwardly of the pallet. The panel 48 is folded outwardly to the extreme limit of its pivotal movement with respect to the panel 43 and is supported with a linkage 50, 51 fully extended and the slide 32 moves down the slideway 53 on the panel to the lower limit of its travel.

The panels 43 and 48 thus form a continuous upwardly and outwardly inclined load supporting surface against which further cargo can be stored on the pallet. It will be understood that a similar pallet extender is provided at the other end of the pallet. If required, the panel 48 can be pivoted with respect to the panel 43 into a vertical attitude as shown in FIG. 16 by adjusting the slide 52 up the slideway 53 on the panel 58 whilst keeping the folding linkage 50, fully extended. From the position the panel 48 can be folded down to engage on the upper ends of the king posts 41 by collapsing the linkages 50, 51 to lie outside the folding linkages 44,45. The studs 42 at the upper ends of the king posts engage in the tracks 53 and the now undersides of the panel 48 to locate the panel 48 and stiffen the structure laterally.

The panel 48 of the extender then provides a further horizontal load supporting platform for the pallet disposed upwardly and outwardly of the end of the pallet and additional cargo can be stowed under the panel 48 against the outwardly inclined face of the lower panel 43.

Figure 18:
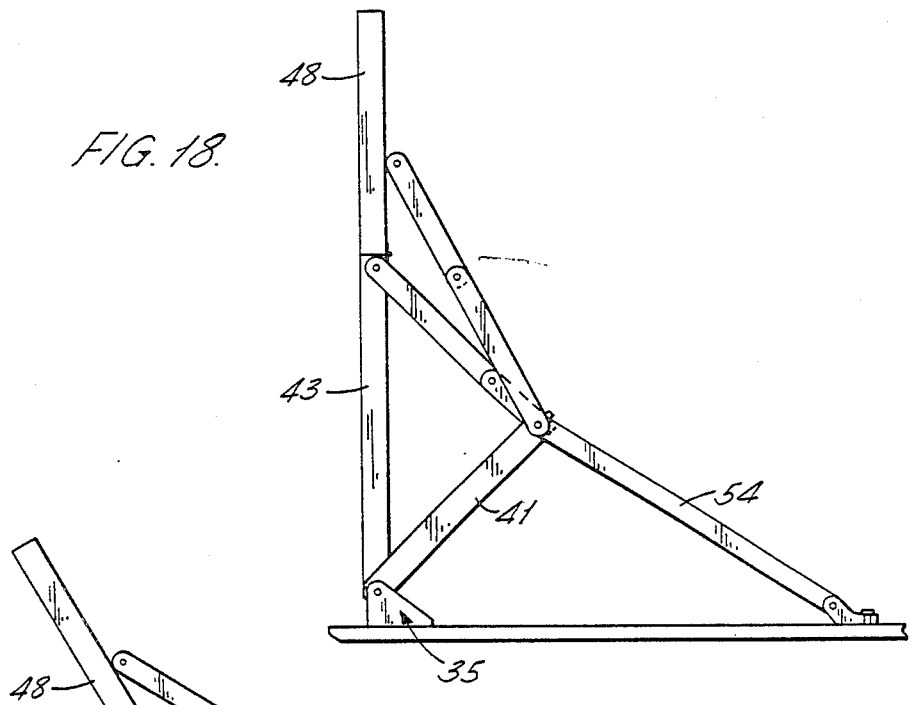
Figure 19:
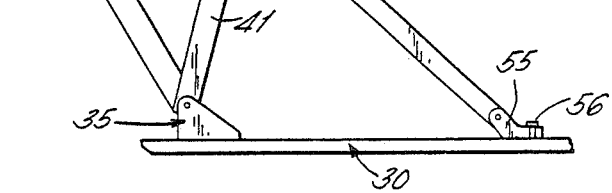
Figure 20:
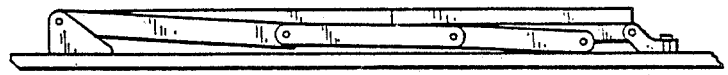

Reverting again to the extended assembly as shown in the FIG. 15 mode the angle of inclination of the panel assembly 43, 48 can be adjusted about the axis of the pivots 40 on the mountings 13 by adjusting the positions of the slides 55 to which the tie members 54 are connected along the tracks 14. Thus by moving the slides 55 further away from the pivotal mountings 35, the panel assembly can be brought into a more upright position as shown in FIG. 19 or into a vertical position as shown in FIG. 18. Ultimately the panel assembly can be folded flat on to the surface of the pallet 30 as shown in FIG. 20.

It will be appreciated that in all the embodiments described above the full load of the pallet extender is imposed on the side edges of the pallet and no direct load is imposed on the end of the pallet. Hitherto pallet extenders have had mountings fitted to the ends of the pallet which have imposed bending moments on the ends of the pallet which are difficult to resist and can distort the pallet. The arrangements described above avoid that difficulty by imposing the load of the pallet extender on the sides only of the pallet which can readily be supported from below.

Figure 21:
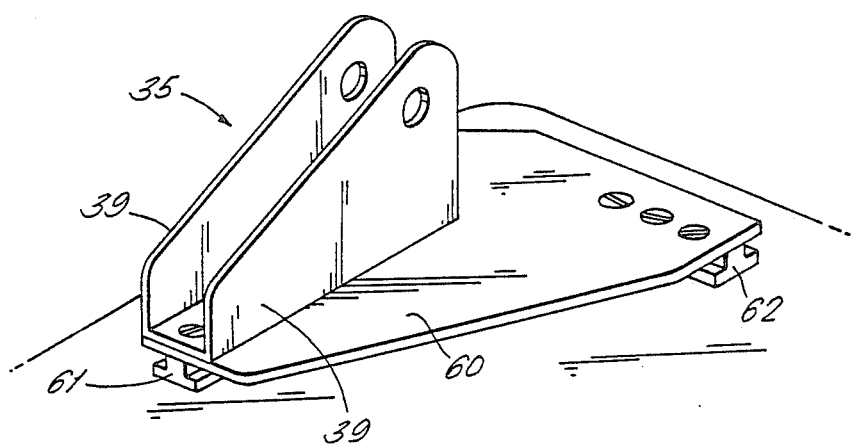

FIG. 21 of the drawings shows a modified form of the pivotal mounting 35 in which the cheeks 39 of the mounting are secured to one edge of a horizontal triangular plate 60 intended to bridge the corner of the pallet. The plate therefore has slides 61 and 62 on the underside which engage in the extruded track at both the side and end of a corner of the pallet. This provides a convenient way for locating and locking the mounting on the pallet during assembly of the track on the pallet. The cheeks plates 39 carry a pivot pin for the king posts 41 and lower panel 43 exactly as described above and since the plates 19 are disposed over the part of the plate attached to the sides of the pallet, the downward load is applied principally to the side edges of the pallet and little or no bending load is applied to the end of the pallet.

FIG. 22 shows the entire structure of the pair of pallet extenders 13 mounted on either end of an aircraft cargo carrying pallet 10, according to the preferred embodiment of the invention heretofore described. In full view, the pallet 10 with the extenders 13 at either end is shown in a perspective view of the entire cargo carrying structure disclosed in this invention.

I claim:

1. A pallet extender for mounting at an end of an aircraft cargo pallet comprising a first elongate load support panel, first means along one elongate edge of the first panel for mounting the first panel along an end of a pallet and for pivoting the first panel about an axis extending along said edge of the first panel, a second elongate panel extending along another elongate edge of the first panel and connected thereto by second means for pivoting the second panel with respect to the first panel, locking means acting between the first and second panels for locking the second panel in any one of a plurality of different positions with respect to the first panel, a support structure at each end of said first panel including a leg member having one end thereof pivotally engaged to said first means and the other end thereof connected to one end of a strut, said strut having the other end thereof connected to said first panel, and brace means connected to the support structures and adapted for connection to the pallet for supporting the panels in selectively different positions with respect to the pallet, said support structures being adapted to support the second panel in a substantially horizontal position when the first panel extends upwardly and outwardly from the end of the pallet supported by said brace means.

2. A pallet extender as claimed in claim 1 wherein each support structure includes an upwardly facing support surface means for receiving and supporting the second panel at said horizontal position.

3. A pallet extender as claimed in claim 2 wherein the leg member and the strut of the support structure at each end of the first panel form a triangulated structure with the end of the first panel, the brace means being connected to the triangulated structure adjacent the other end of said leg member, said brace means adapted to provide support for said triangulated structure.

4. A pallet extender as claimed in claim 2 or claim 3 wherein each of the brace means comprises a tie member connected at one end to one of said support structures and at the other end having means for removable attachment to the pallet at spaced locations along the edge of the pallet to hold the first panel in any required position of pivotal adjustment about the axis defined by the first means along the one elongate edge of the first panel.

5. A pallet extender as claimed in claim 1 wherein the means for locking the second panel at any required position with respect to the first panel comprise plates mounted on the ends of the first panel to encompass the arc of movement of the second panel with respect to the first panel and means for locking the second panel in any required position of adjustment with respect to the plates to lock the second panel with respect to the first panel.

6. A pallet extender as claimed in claim 5 wherein each plate has a plurality of holes therein defining positions of adjustment to the second panel with respect to the first panel and locking members are provided to engage in selected holes of said plurality of holes in the plates to lock the second panel to the plates.

7. A pallet extender as claimed in claim 1 wherein each panel comprises a frame at least partially covered in sheet metal.

8. A pallet extender as claimed in claim 1 wherein the second means pivoting the second panel to the first panel comprises an elongate hinge extending the length of the first and second panels.

9. A pallet extender as claimed in claim 1 wherein the first means for pivotally mounting the first panel to a pallet comprises two hinges spaced apart along said one elongate edge of the first panel, each hinge having one member attached to the first panel and a second member having means for attaching said hinge to an edge part of the pallet.

10. An aircraft cargo pallet having a pair of pallet extenders as claimed in claim 1 mounted at opposed ends of the pallet.

11. A pallet extender for mounting adjacent an end of an aircraft cargo pallet comprising a first load supporting panel to extend along an end of a pallet, said pallet having tracks at the sides and ends thereof, a second load supporting panel pivotally mounted on an elongated edge of said first panel and adjustable support means for each end of the first and second panels adapted to be engaged to opposed sides of the panels for adjustably supporting the panels in a plurality of different positions with respect to the pallet including supporting the panels so that said second panel is in a substantially horizontal position in order to selectively provide an extension of the load carrying area of the pallet and another position in which the panels are stowed on the pallet, so that in use, the full load of the extender and cargo stowed thereon is supported by said adjustable support means, each of said adjustable support means including a post having one end thereof pivotally mounted on a pivotal mounting, a tie member having one end connected to the other end of said post and the other end thereof pivotally mounted on an anchor device and linkage members coupled between and to said panels and said post, said pivotable mounting and said anchor device both capable of being selectively positioned along and attached to said tracks at the sides of the pallet.

12. A pallet extender as claimed in claim 11 wherein said first panel is pivotally engaged to said pair of pivotal mountings along a lower edge of said first panel providing a common axis extending across the pallet adjacent said end thereof about which the first panel may be pivoted.

13. A pallet extender as claimed in claim 12 wherein said post having said one end thereof pivotally mounted to said pivotal mounting is capable of swinging about said axis extending across the pallet end, and said tie member is pivotally connected to the post at said other end of said post in order to support the post in a required position with respect to the pallet including a vertical position in which the second load supporting panel rests on upper ends of the posts and is supported thereby in a horizontal position.

14. A pallet extender as claimed in claim 11 wherein said pivotal mountings are adapted to engage said tracks at both the sides and ends of the pallet.

15. A pallet extender as claimed in claim 11 wherein said pivotal mountings and said anchor devices are adapted to engage an extruded track provided on the pallet.

16. A pallet extender for mounting adjacent an end of an aircraft cargo pallet comprising at least one load supporting panel to extend along an end of a pallet and adjustable support means for each end of the panel adapted to be mounted on opposed side edges of the panel for supporting the panel in a plurality of different positions with respect to the pallet including a first position where said panel is disposed substantially horizontally to provide an extension of the load carrying area of the pallet and a second position in which the panel is stowed on the pallet, so that in use, the full load of the extender and cargo stowed thereon is transmitted through said adjustable support means to side edges of the pallet;

the adjustable support means for said load carrying panel including a pair of pivotal mountings adapted for mounting on the side edges of the pallet to provide a common axis extending across the pallet adjacent said end thereof about which the panel may be pivoted and tie members for each support means each having one end connected to one of said support means at a location spaced from the pivotal mounting thereof and an opposite end connected to an anchorage device for securing to the side edge of the pallet at a location spaced along the edge from said pivotal mounting to hold the support means and load supporting panel in a required attitude;

each adjsutable support means further comprising a post supported at one end on said pivotal mounting to swing about said axis extending across the pallet end, the tie member being pivotally connected at said one end thereof to the post at another end of said post to support the post in a required attitude with respect to the pallet including a vertical position in which the load supporting panel rests on upper ends of the posts and is supported thereby in a horizontal position disposed upwardly and outwardly from said end of the pallet; and the adjustable support means further comprising a further panel hinged to said load supporting panel along one edge of the further panel to allow a load supporting panel to be folded toward and away from the further panel through a range of angles of adjustment, the further panel being pivotally mounted along its other edge between the posts to the pivotal mountings supporting the posts, a first connecting means extending between the posts and the further panel for holding the further panel in different required positions of adjustment with respect to the posts to provide support for the load supporting panel and further connecting means between the posts and the load supporting panel for holding the load supporting panel in a plurality of positions of adjustment with respect to the posts.

17. A pallet extender as claimed in claim 16 wherein the further connecting means between the posts and the load supporting panel comprise foldable linkages to restrain the load supporting panel against pivotal movement away from the posts while permitting the load supporting panel to be folded down onto the upper ends of the posts.

18. A pallet extender as claimed in claim 16 wherein linearly adjustable mountings are provided across the ends of the load supporting panel to which the folding linkages are connected to permit the position of the load supporting panel to be adjusted with respect to the posts by movement of the mountings along the ends of the panel.

19. A pallet extender as claimed in claim 16 wherein the connecting means between the further panel and posts comprise folding linkages to permit the further panel to be selectively pivoted outwardly from the posts to a predetermined inclination with respect to the posts and to be folded between the posts for stowing the extender in collapsed form on the pallet.

* * * * *